United States Patent [19]
Weber

[11] 4,000,911
[45] Jan. 4, 1977

[54] HITCH MECHANISM FOR TOWING AND MANEUVERING MOBILE HOMES AND MODULAR HOME SECTIONS

[75] Inventor: Charles A. Weber, Elkhart, Ind.
[73] Assignee: Bock Products, Inc., Elkhart, Ind.
[22] Filed: Oct. 16, 1975
[21] Appl. No.: 622,810
[52] U.S. Cl. .............................. 280/468; 280/490 R
[51] Int. Cl.² .......................................... B60D 1/18
[58] Field of Search ............... 280/456 R, 462, 467, 280/468, 469, 470, 490 R

[56] References Cited
UNITED STATES PATENTS

| | | | |
|---|---|---|---|
| 2,979,341 | 4/1961 | Thomas | 280/468 X |
| 3,269,751 | 8/1966 | Whattoff | 280/490 R X |
| 3,554,578 | 1/1971 | Reed | 280/490 R |
| 3,891,239 | 6/1975 | Leo | 280/468 X |

*Primary Examiner*—Philip Goodman
*Assistant Examiner*—R. Schrecengost
*Attorney, Agent, or Firm*—Marmaduke A. Hobbs

[57] ABSTRACT

A hitch mechanism for towing and maneuvering mobile and modular home sections, in which a frame structure is mounted on the rear of the towing vehicle and a carriage is connected to the frame structure and supports a hitch head for connection to the towed vehicle. A first, second and third power means are provided for moving the hitch head laterally, vertically and longitudinally, the power means preferably being hydraulic cylinders operated by the hydraulic system of the towing vehicle. The frame structure is mounted on the towing vehicle and supports the power means for moving the hitch head and the adjacent end of the mobile and modular home sections laterally, vertically and longitudinally to assist in distributing the load for towing and to place the mobile or modular home section in the desired position at the location.

13 Claims, 13 Drawing Figures

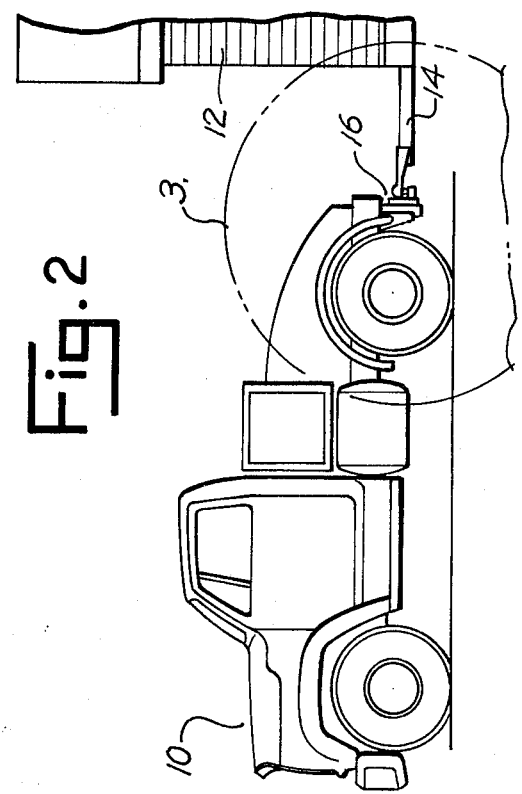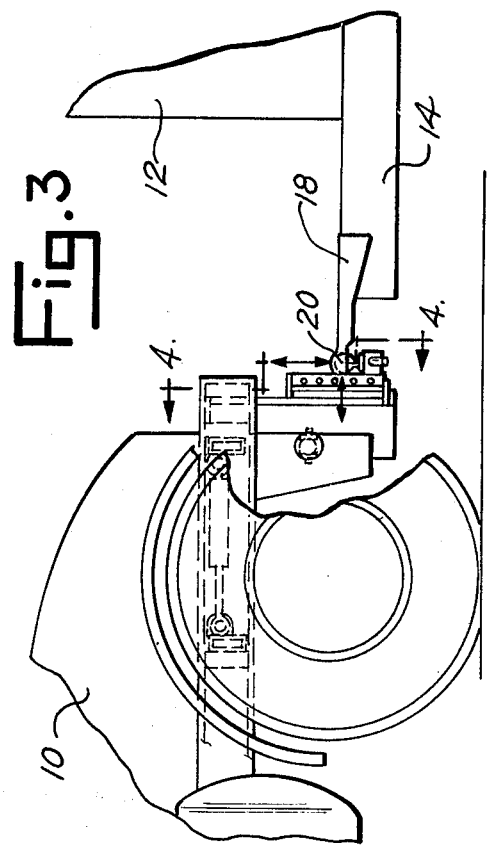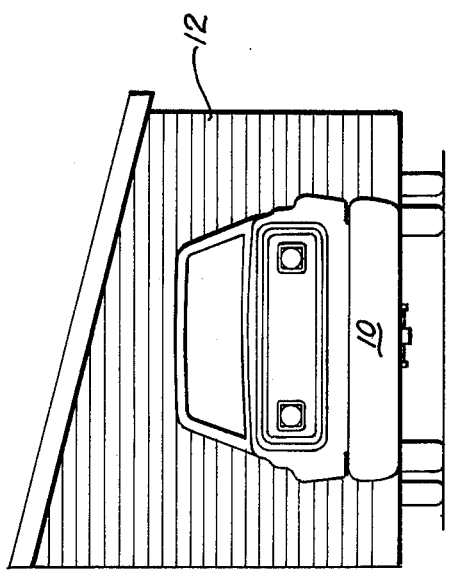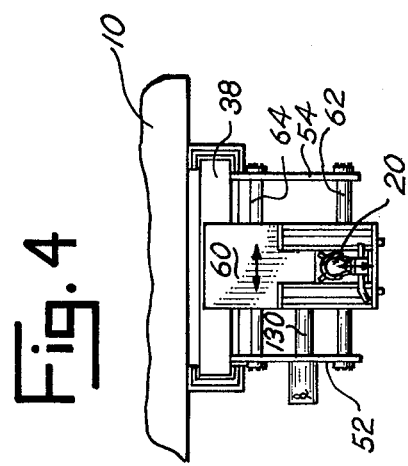

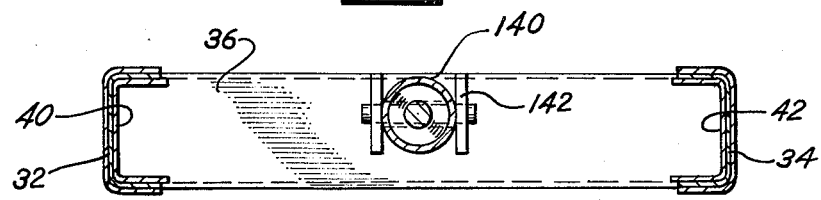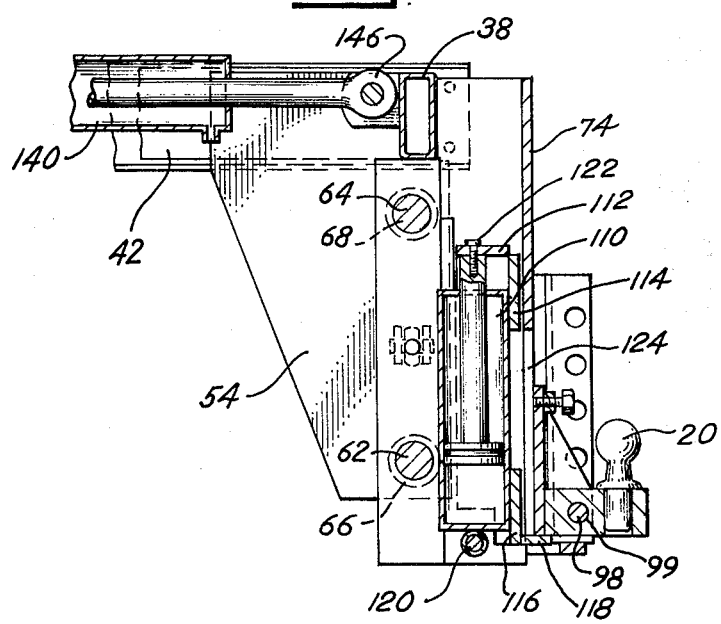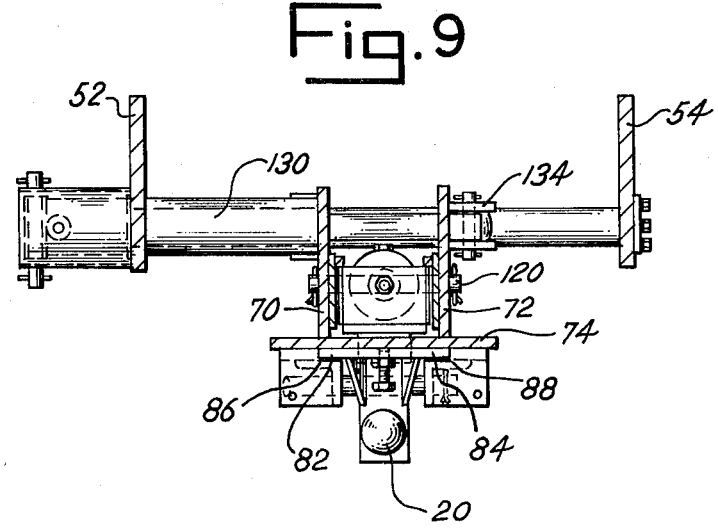

HITCH MECHANISM FOR TOWING AND MANEUVERING MOBILE HOMES AND MODULAR HOME SECTIONS

The conventional double-wide mobile home and modular home are constructed in two longitudinal sections with each section being mounted on a separate frame and undercarriage, and these two sections are transported over the highways to the location where the home is to be assembled, often on a permanent foundation. In some instances they may be delivered to a dealer where the two sections are placed together on a temporary foundation or other support for displaying the home. When the mobile or modular home sections are mounted on the permanent foundation, the undercarriage is normally removed, and the home structure, including the main or base frame, is assembled on the foundation with one section first being properly aligned on the foundation and the second section slid into place and aligned with the first section, and the two sections joined permanently together. The double-wide mobile home, which consists essentially of two separate mobile homes placed together side-by-side in alignment with one another and then securely attached so that the two homes become in effect a single dwelling, are frequently left on the undercarriage, but they may be placed on a permanent foundation in a manner similar to the sections of modular homes. In locating the second section of the double-wide mobile home with respect to the first, and in placing the second section of the modular home in proper alignment on a permanent foundation, appreciable difficulty is often encountered in maneuvering the second section sidewise into contact with the initially placed first section, unless heavy and expensive equipment such as a crane is used to handle the sections. If a crane is not used, rollers and jacks are normally used to slide the section sidewise into place in contact with the first section, this type of operation being not only tedious but time consuming and costly. It is therefore one of the principal objects of the present invention to provide a hitch mechanism which is adapted to tow the sections of double-wide mobile homes and sections of modular homes, and is capable of maneuvering the sections forwardly, rearwardly, vertically and sidewise in either direction as the sections are being assembled together at the final site or on a dealer's lot, to obtain final alignment of the two mobile or modular home sections relative to one another, and which can perform many of these operations without moving the truck tractor or other vehicle on which the hitch mechanism is mounted.

Another object of the invention is to provide a hitch mechanism which will move the hitch head for mobile and modular home sections in six directions, to maneuver the home sections, within limits, to any desired position, and which can be easily and efficiently operated by one person from the towing truck or other vehicle.

A further object is to provide a hitch mechanism for towing mobile and modular home sections, which can adjust the position of the hitch head or ball to assist in connecting and disconnecting the home section and to shift the head or ball to obtain optimum load distribution on the section relative to the truck or tractor, and which enhances the safety of the home section positioning operation over the practice presently used.

Still another object of the invention is to provide a hitch mechanism of the aforesaid type which can be easily installed on the conventional trucks and tractors for towing mobile and modular home sections, and which can be readily adjusted to tow various makes and models of mobile and modular homes.

Additional objects and advantages of the present hitch mechanism will become apparent from the following description and accompanying drawings, wherein:

FIG. 1 is a front elevational view of a truck and the front end of a modular home section being towed by the truck and connected to the truck by the present hitch mechanism;

FIG. 2 is a side elevational view of the truck shown in FIG. 1 and a partial side elevational view of the modular home section, showing the section connected to the truck by the present hitch mechanism;

FIG. 3 is an enlarged fragmentary elevational view of the truck, mobile home section and hitch shown in FIG. 2, the enlarged portion being indicated by the circle identified by numeral 3 of FIG. 2;

FIG. 4 is a rear elevational view of the hitch mechanism mounted on a truck;

FIG. 7 is a vertical cross sectional view of the hitch mechanism and the truck frame shown in the preceding figures, the section being taken on line 7—7 of FIG. 5;

FIG. 8 is a vertical cross sectional view of the hitch mechanism shown in the preceding figures, the section being taken on line 8—8 of FIG. 6; and FIG. 9 is a horizontal cross sectional view of the hitch mechanism shown in the preceding figures, the section being taken on line 9—9 of FIG. 6.

Figure 5:
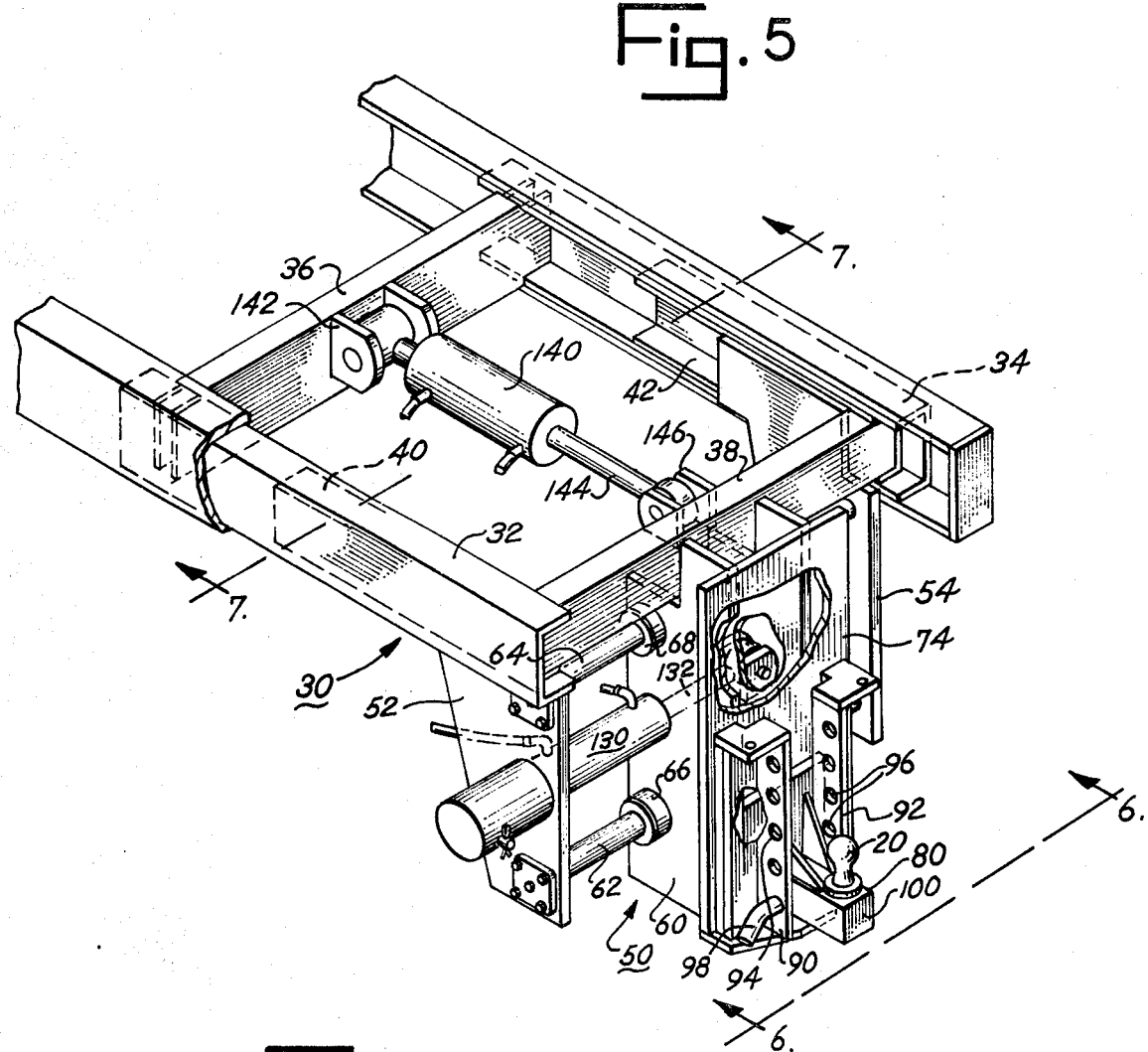
FIG. 5 is a perspective view of the hitch mechanism mounted in operating position on a truck.
Figure 6:
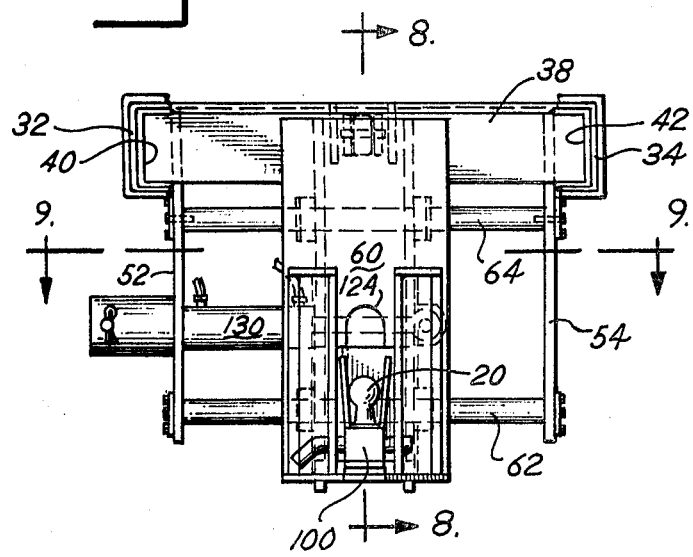
FIG. 6 is a rear elevational view of the hitch mechanism shown in the preceding figures.

Referring more specifically to the drawings, numeral 10 indicates generally a conventional truck adapted to tow mobile homes, and sections of double-wide and modular homes, a section of a modular home being indicated by numeral 12, the section having a tongue or draw bar 14 connected to truck 10 by the present hitch mechanism indicated generally by numeral 16 mounted on the rear of the truck. The present mechanism 16 can be mounted on various types of trucks and tractors for hauling mobile homes and can be operated effectively to maneuver the mobile home and sections of the double-wide or modular home to various lateral, vertical, forward and rearward positions with respect to the truck. A hitch part 18 is rigidly connected to tongue or tow bar 14 and engages hitch head or ball 20 mounted on the rear of hitch mechanism 16. The hitch part 18 and head or ball 20 are standard parts for most hitches used in towing mobile, double-wide and modular homes.

The hitch mechanism consists of a rectangular frame 30 formed by side members 32 and 34 and forward and rear end cross members 36 and 38, respectively. The cross member 36 is connected rigidly to side members 32 and 34 to form a rigid structure. Cross member 38 is slidably mounted on runners 40 and 42 in a track formed by the U-shaped structure of frame members 32 and 34, cross member 38 being rigidly secured to runners 40 and 42 so that the two runners and cross members move together, forward and rearwardly between frame members 32 and 34. A body, indicated generally by numeral 50, is rigidly connected to end cross member 38 and extends downwardly therefrom to support the head or ball 20, the body being connected to cross member 38 by side members 52 and 54 which are also rigidly connected to runners 40 and 42. Thus the body is movable forwardly and rearwardly as runners 40 and 42 slide in frame members 32 and 34.

A carriage 60 is mounted between and supported by side members 52 and 54 on horizontally disposed rods 62 and 64, the ends of which are secured rigidly to side members 52 and 54. Bearings 66 and 68 mounted in the carriage on each side are preferably journalled on the rods so that the carriage will move freely laterally on the rods. The carriage includes two side plates 70 and 72 to which bearings 66 and 68 are connected, and a face plate 74 interconnecting the rear vertical edges of plates 70 and 72 to form a rigid structure. Mounted on the rear face of plate 74 is a ball assembly which has a hitch head 80 and flanges 82 and 84 disposed in vertical tracks 86 and 88 on the face of plate 74, thus permitting the ball assembly to move vertically from the lower position shown in the drawings to various elevated positions. The track structure includes flanges 90 and 92 having a plurality of aligned holes 94 and 96 through which a pin 98 is inserted. A corresponding hole 99 for the pin is in the hitch head member 100 so that when the pin is inserted through the hole in the hitch head in aligned holes in the track flanges, the ball assembly is held in a fixed position while the mobile or modular sections are being transported.

The hitch assembly is adjusted vertically, when pin 98 has been removed, by cylinder 110 disposed in a box shaped frame 112 having cross bars 114 and 116. A foot 118 is connected to cross bar 116 of frame 112 and engages the lower part of the hitch assembly in order to raise the hitch assembly when cylinder 110 is operated, the cylinder being a hydraulic device which raises and lowers the hitch assembly and depends on the weight of the trailer and/or hitch assembly to remove the hitch aassembly to a lowered position. The cylinder is held firmly in place by a cross rod 120 disposed between side plates 70 and 72 at its lower end, and by bolt or screw 112 connecting the upper end of the piston rod to frame 112. A slot 124 is provided in the lower center of rear plate 74 to permit foot 118 to travel upwardly in adjusting the ball assembly vertically in tracks 86 and 88.

The carriage 60 is moved laterally on rods 62 and 64 by a hydraulic cylinder 130 mounted on side member 52 and connected to the carriage by piston rod 132 extending through plates 70 and 72 and connected to fixture 134 secured to plate 72. Thus, when the cylinder, which is a two-way hydraulic device, is operated, the carriage is moved laterally in one direction or the other. The carriage, and hence the ball assembly, are moved forwardly and rearwardly by hydraulic cylinder 140 connected to cross member 36 by fixture 142 and to cross member 38 by piston rod 144 and fixture 146, the fixture being rigidly secured to cross member 38. Thus, when cylinder 140, which is a two-way hydraulic device, is operated, body 50 is moved forwardly or rearwardly as members 40 and 42 slide in frame members 32 and 34.

The present hitch mechanism can be easily and readily assembled in a truck or tractor for towing mobile homes and sections of mobile and modular homes by inserting the frame 30, consisting of members 32, 34 and 36 as an integral unit in the side frame members of the truck or tractor. Frame 30 is inserted in the truck frame or tractor with the ball assembly positioned at the lower portion thereof for receiving hitch member 18 of the mobile home or section 12, and the frame is secured in place by any suitable means, such as screws or bolts extending through the forward end of frame members 32 and 34 and the adjacent frame members of the truck or tractor. The hydraulic cylinders are connected by hydraulic lines to source of fluid under pressure such as to a separately driven pump or to the hydraulic system of the truck or tractor, and the controls therefor may be mounted either in the cab of the truck or at some location near the rear of the truck where the operator can easily see what adjustments are being made in the mechanism as he is operating the controls. Further, the hitch mechanism can be easily removed from the truck or tractor if it is desired to return the truck or tractor to its conventional operating condition.

In the operation of the present hitch mechanism mounted in the manner described herein and connected to the hydraulic system of the vehicle, hitch head 80 is connected to the mobile home or modular home section by ball 20 and hitch part 18. The elevation of the ball can be varied to suit requirements by operation of cylinder 110 to raise the ball assembly to any desired position along two tracks 86 and 88. When a position has been selected, hole 99 in member 100 is aligned with corresponding holes 94 and 96 in the flanges of the two tracks and pin 98 is inserted therein to hold the hitch assembly in a fixed position. The vehicles are then connected for transportation to the final location. In order to align the two vehicles for most effective towing, cylinder 130 is operated to shift carriage 60 laterally one way or the other on rods 62 and 64 as required. When the mobile or modular home sections arrive at the place where they are to be permanently located, the first section of a modular or double-wide home, for example, is maneuvered into proper position and the second section is maneuvered into aligned side-by-side contact with the first section. With the use of the new hitch mechanism, the second section can be maneuvered without maneuvering the truck, by the operation of any one or more of the hydraulic cylinders 110, 130 and 140 to raise the forward end of the section and/or to move it laterally and longitudinally as required to align the two sections. This is done relatively quickly, without maneuvering the truck, after the section has been placed in approximate position.

One of the particular advantages is that small but necessary movements can be made laterally, vertically and longitudinally in the mobile or modular home sections, and can be made effectively and conveniently by the operator, and if the controls are conveniently placed for operation, the movement can be effectively observed by the operator while the adjustment in the section is being made. Thus, the mobile or modular home section can be delivered to the location and placed in final position without disconnecting it from the truck or tractor, by using the present hitch mechanism to perform the final locating operation.

While only one embodiment of the present hitch mechanism has been described in detail herein, various changes and modifications may be made without departing from the scope of the invention.

I claim:

1. A hitch mechanism for towing and maneuvering mobile homes, mobile and modular home sections and similar vehicles, comprising a carriage, a means for mounting said carriage on the rear of a towing vehicle, a hitch head mounted on said carriage for connection to the towed vehicle, a first power means for moving said hitch head laterally, a second power means for moving said hitch head vertically, and a third power means for moving said hitch head forwardly and rearwardly, whereby the adjacent end of the mobile home or mobile or modular home section connected to said hitch head can be moved laterally, vertically and longitudinally without moving the towing vehicle on which the hitch mechanism is mounted.

2. A hitch mechanism as defined in claim 1 in which a transversely extending track means is provided for said carriage and said first power means is connected to said carriage for moving said carriage laterally on said track means.

3. A hitch mechanism as defined in claim 2 in which a frame for mounting on the towing vehicle supports said track means for forward and rearward movement by said third power means.

4. A hitch mechanism as defined in claim 1 in which a means is provided for mounting said second power means on said carriage and means connects said power means to said hitch head for moving said hitch head vertically with respect to said carriage.

5. A hitch mechanism as defined in claim 3 in which a means is provided for mounting said second power means on said carriage and means connects said power means to said hitch head for moving said hitch head vertically to said carriage.

6. A hitch mechanism as defined in claim 2 in which a first frame structure is adapted to be mounted between the side frame members of the towing vehicle and a second frame structure is connected to said first frame structure and supports said track means for forward and rearward movement with respect to said first frame structure.

7. A hitch mechanism as defined in claim 6 in which said first power means is mounted on said second frame structure for moving said carriage laterally on said track means.

8. A hitch mechanism as defined in claim 7 in which said third power means is connected to said first and second frame structures for moving said second structure forwardly and rearwardly relative to said first frame structure.

9. A hitch mechanism as defined in claim 8 in which track means is provided for guiding said hitch head vertically on said carriage and means is provided for locking said hitch head in various preselected vertical positions along said last mentioned track means.

10. A hitch mechanism as defined in claim 8 in which said first, second and third power means are hydraulically actuated cylinder and piston devices.

11. A hitch mechanism for towing and maneuvering mobile homes, modular home sections and similar vehicles, comprising a rectangular frame for mounting on a vehicle towing tractor, a vertically positioned frame depending from said first frame and being slidable forwardly and rearwardly therealong, track means disposed horizontally in spaced relation in said second frame, a carriage mounted on said horizontal track means, a hitch head mounted on said carriage for connection to the towed vehicle, a first hydraulic device for moving said second frame forwardly and rearwardly along said first frame, a second hydraulic device for moving said carriage along said track means, and a third hydraulic device for moving said hitch head vertically relative to said carriage.

12. A hitch mechanism as defined in claim 11 in which said first hydraulic device interconnects said rectangular and vertical frames, said second hydraulic device is mounted on said vertical frame and connected to said carriage, and said third hydraulic device is mounted on said carriage and connected to said hitch head.

13. A hitch mechanism as defined in claim 12 in which a means is provided on said carriage for guiding and supporting said hitch head and means is provided for locking said hitch head in various adjusted vertical positions.

* * * * *